United States Patent

Harumoto et al.

[11] Patent Number: 5,978,879
[45] Date of Patent: Nov. 2, 1999

[54] BUS BRIDGE APPARATUS

[75] Inventors: Hideaki Harumoto, Moriguchishi; Toshiyuki Ochiai, Ibarakisi; Taihei Yugawa, Narashi, all of Japan

[73] Assignee: Matsushita Electric Industrial Co., Ltd., Japan

[21] Appl. No.: 08/877,208

[22] Filed: Jun. 17, 1997

[30] Foreign Application Priority Data

Jun. 18, 1996 [JP] Japan .................................... 8-156781

[51] Int. Cl.$^6$ .................................................. G06F 13/00
[52] U.S. Cl. ........................................... 710/129; 710/110
[58] Field of Search .................................. 395/306, 308, 395/309, 290; 710/110, 126, 128, 129

[56] References Cited

U.S. PATENT DOCUMENTS 5,717,873  2/1998  Rabe et al. ............................... 395/290

FOREIGN PATENT DOCUMENTS 2-178752  7/1990  Japan .
2-178753  7/1990  Japan .

OTHER PUBLICATIONS

"DEC Chip 21050 PCI-to-PCI Bridge Data Sheet (First Edition, Dec. 1993)".

Primary Examiner—Glenn A. Auve
Attorney, Agent, or Firm—Parkhurst & Wendel, L.L.P.

[57] ABSTRACT

A bus bridge apparatus that connects two system buses independent of each other to which a bus arbiter operating independently and located outside of the apparatus, has a function for serving as a master and a slave of the system buses, a base address holding means, and a bus address generating means. When, to access a slave device on a first system bus, a master device on a second system bus attempts to access the apparatus, generating offset from addresses received from the master device and combining the offset with base addresses previously stored in said base address holding means, to generate an access destination address in the slave device by using said bus address generating means, this bus bridge apparatus performs functions: (i) issuing the generated access destination address by serving as a bus master on the first system bus, to access the slave device; and (ii) performing data transfer between the master device and the slave device by serving as a slave of the master device on the second system bus. It is thus possible to realize mutual access between system buses having an independent arbitration function, without changing system design.

1 Claim, 12 Drawing Sheets

BUS BRIDGE APPARATUS

FIELD OF THE INVENTION

The present invention relates to a bus bridge apparatus that mutually connects computer systems having a plurality of buses, and particularly buses requiring real-time control.

BACKGROUND OF THE INVENTION

As a method of bridging double system buses that are independent of each other, there are known an arbitrating apparatus disclosed in Japanese Patent Published Application No. 6-89257 (1994), a bus system and a bus bridge method in Japanese Patent Published Application No. 6-164594 (1994), a bus bridge for information processing apparatus in Japanese Patent Published Application No. 6-37768 (1994), and DEC Chip 21050 PCI-to-PCI Bridge Data Sheet (First Edition, December 1993). All are directed to realize a bus bridge function by that a bus bridge includes an arbitration function of at least one bus.

FIG. 12 is a diagram showing a computer system in which two buses are connected by a bus bridge apparatus. A first bus 1210 is independent of a second bus 1220. A first master device 1211, a first slave device 1212, a first arbiter 1213 are connected to the first bus 1210. Second master devices 1221, 1224, a second slave device 1222 and a second arbiter 1223 are connected to the second bus 1220. Between the first bus 1210 and the second bus 1220, a bus bridge apparatus 1201 is disposed. In order that the first master bus 1211 accesses the second slave device 1222, the bus bridge apparatus 1201 serves as a slave device on the first bus 1210 to respond to the first master device 1211, and, at the same time, serves as a master device on the second bus 1220 to access the second slave device 1222. Similarly, in order that the second master device 1221 accesses the first slave device 1212, the bus bridge apparatus 1201 serves as a slave device on the second bus 1220 to respond to the second master device 1221, and, at the same time, serves as a master device on the first bus 1210 to access the first slave device 1212.

Assume that the aforesaid two accesses occur at the same time. On the first bus 1210, since the first arbiter 1213 has assigned bus access right to the first master device 1211, the bus bridge apparatus 1201 cannot be assigned bus access right as a master device to gain access from the second master device 1221 to the first slave device 1211, until access of the first master device 1211 has been completed.

On the second bus 1220, since the second arbiter 1223 has assigned bus access right to the second master device 1221, the bus bridge apparatus 1201 cannot be assigned bus access right as a master device to gain access from the first master device 1211 to the second slave device 1222, until access of the second master device 1201 has been completed. Therefore, both buses' operations have no progress, i.e., a so-called deadlock condition occurs.

To solve this problem, for example, processing has been conducted to prevent access right from being assigned to the first master device 1211 and the second master device at the same time, by disposing an arbiter inside a bridge to give preference to the bus 1210 or 1220.

In an independent bus in which access time-out exits, when conducting a slave access across the bus, it is difficult to start access in another bus when a bus to which access is desired is busy. Accordingly, time-out is likely to occur before a cycle ends. To avoid this, it is necessary to complete access within a given time. This has been solved by disposing an arbiter inside a bridge and raising the precedence of a bus bridge as a master device.

However, provided that an arbiter is disposed inside a bridge, independent systems, each having an arbiter, cannot be connected under the present systems. It is thus necessary to change system design.

SUMMARY OF THE INVENTION

It is an object of the present invention to provide a bridge function that realizes mutual bus accesses by keeping arbitration functions of independent buses as they are, and adding later a bridge having master and slave functions alone to each bus, without newly designing a system.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of the present invention, a bus bridge apparatus that connects two system buses independent of each other to which a bus arbiter operating independently and located outside of the apparatus, has a function for serving as a master and a slave of the system buses, a base address holding means, and a bus address generating means.

When, to access a slave device on a first system bus, a master device on a second system bus attempts to access the apparatus, generating offset from addresses received from the master device and combining the offset with base addresses previously stored in said base address holding means, to generate an access destination address in the slave device by using said bus address generating means, this bus bridge apparatus performs functions: (i) issuing the generated access destination address by serving as a bus master on the first system bus, to access the slave device; and (ii) performing data transfer between the master device and the slave device by serving as a slave of the master device on the second system bus.

It is thus possible to realize mutual access between system buses having an independent arbitration function, without changing system design.

According to a second aspect of the invention, in the bus bridge apparatus of the first aspect, when, by an access as a slave device by a master device on a second system bus for reading data from a slave device on a first system bus, the apparatus issues a bus acquisition request to an arbiter on the first system bus for serving as a bus master of the first system bus so that time-out is likely to occur on the second system bus before acquiring the right to use the first system bus, the bus bridge apparatus performs functions: (i) on the second system bus, issuing a resending request to the master device, to terminate a bus cycle temporarily; and (ii) on the first system bus, if it is before the bus bridge apparatus acquires the right to use the first system bus, abandoning the request and, it is after acquiring the right, reading data from the slave device and abandoning the read data, without holding it in the apparatus, to terminate a bus cycle of the first system bus.

It is thus possible to realize mutual access between system buses having an independent arbitration function, without changing system design, and to avoid time-out even when a system bus on which a slave device to be accessed is present, is busy.

According to a third aspect of the invention, the bus bridge apparatus of the first aspect includes a bus cycle, generating means having a function by which a bus cycle start operation for accessing a slave device is delayed when the apparatus acquires the right to use a first system bus, wherein provided that the first system bus is a bus in which a master device obtained bus use right by issuing a bus acquisition request has the right to start a cycle for accessing a slave device.

When, by an access as a slave device by a master device on a second system bus for accessing a slave device on a first system bus, the apparatus issues a bus acquisition request to an arbiter on the first system bus for serving as a bus master of the first system bus so that time-out is likely to occur on the second system bus before acquiring the right to use the first system bus, this bus bridge apparatus performs functions: (i) on the second system bus, issuing a resending request to the master device to terminate a bus cycle temporarily; (ii) on the first system bus, if it is before the apparatus acquires the right to use the first system bus, abandoning the bus acquisition request and, if it is after acquiring the right, delaying the cycle start operation while retaining the bus use right, by using said bus cycle generating means, thereafter; and (iii) starting the cycle for accessing a slave device on the first system bus if, before the bus use right is taken by an arbiter on the first system bus, a master device on the second system bus attempts to access the apparatus for accessing a slave device on the first system bus.

It is thus possible to realize mutual access between system buses having an independent arbitration function, without changing system design, and to avoid time-out even when a system bus on which a slave device to be accessed is present, is busy.

According to a fourth aspect of the invention, the bus bridge apparatus of the first aspect includes means for temporarily holding transferred data and means for storing name of a master device accessing, as a bus master, to the apparatus.

When, by an access as a slave device by a master device on a second system bus for reading data from a slave device on a first system bus, the apparatus issues a bus acquisition request to an arbiter on the first system bus for serving as a bus master of the first system bus so that time-out is likely to occur on the second system bus before acquiring the right to use the first system bus, this bus bridge apparatus performs functions: (i) on the second system bus, issuing a resending request to the master device to terminate a bus cycle temporarily, and storing that the resending request was issued to the master device, in said storing means; (ii) on the first system bus, issuing a bus acquisition request until the acquisition of the right to, use the first system bus, and reading data from the slave device and then holding it in said holding means; and (iii) on the second system bus, issuing a resending request when a second master device acquires the right to use the second system bus to access the apparatus, on the other hand, when the first master device acquires the right to use the second system bus to access again the apparatus, issuing a resending request if it is before data from the slave device is read in said holding means, whereas transferring data held in said holding means to the first master device and then nullifying the content stored in said storing means, if it is after reading the data.

It is thus possible to realize mutual access between system buses having an independent arbitration function, without changing system design, and to avoid time-out even when a system bus on which a slave device to be accessed is present, is busy. In addition, the master device can always access the slave device in a given time.

According to a fifth aspect of the invention, the bus bridge apparatus of the first aspect includes a bus cycle generating means having a function by which a bus cycle start operation for accessing a slave device is delayed when the apparatus acquired the right to use the first system bus, wherein provided that the first system bus is a bus in which a first master device having bus use right by issuing a bus acquisition request has the right to start a cycle for accessing a slave device.

When, by an access as a slave device by a master device on a second system bus for accessing a slave device on a first system bus, the apparatus issues a bus acquisition request to an arbiter on the first system bus for serving as a bus master of the first system bus so that time-out is likely to occur on the second system bus before acquiring the right to use the first system bus, this bus bridge apparatus performs functions: (i) on the second system bus, issuing a resending request to the first master device to terminate a bus cycle temporarily, and storing that the resending request was issued to the first master device, in said storing means; (ii) on the first system bus, issuing a bus acquisition request until the acquisition of the right to use the first system bus, and delaying the cycle while retaining the bus use right, by said bus cycle generating means, thereafter; (iii) if the bus use right is taken by an arbiter on the first system bus, issuing again a bus acquisition request to the arbiter on the first system bus, to acquire the right to use the first system bus, and delaying the cycle start operation while retaining the right, by using said bus cycle generating means; and (iv) when, on the second system bus, a second master device acquires the right to use the second system bus to access the apparatus, issuing a resending request, on the other hand, when the first master device acquires the right to use the second system bus to access again the apparatus, issuing a rerunning or retry request if it is before acquiring the right to use the first system bus, whereas accepting the request, starting access to the slave device on the first system bus, and nullifying the content stored in said storing means, if the right has been acquired.

It is thus possible to realize mutual access between system buses having an independent arbitration function, without changing system design, and to avoid time-out even when a system bus on which a slave device to be accessed is present, is busy. In addition, a master device can always access a slave device in a given time.

According to a sixth aspect of the invention, the bus bridge apparatus of the first aspect includes inter-slave transfer data holding means (hereinafter referred to as "first holding means") for temporarily holding transferred data when, in two system buses being independent of each other, transferring data between a first slave device on a first system bus and a second slave on a second system bus, by serving as a master on both system buses; and master/slave transfer data holding means (hereinafter referred to as "second holding means") for temporarily holding transferred data when transferring data between the first slave device on the first system bus and a master device on the second system bus, by serving as a master on the first system bus and as a slave on the second system bus.

This bus bridge apparatus performs reading data from the first slave device and storing it in the first holding means by serving as a master of the first system bus.

When, by data transfer function for writing data stored in the first holding means to the second slave device, transferring data stored in the first slave device to the second slave device by serving as a master of the second system bus, if issued a bus acquisition request to an arbiter on the second system bus for serving as a master of the second system bus after reading data from the first slave device and storing it in the first holding means:

For a case where the master device on the second system bus has acquired the right to use the second system bus for writing data in a third slave device on the first system bus, this apparatus perform functions: (i) stopping data transfer from the first slave device to the second slave device while retaining data of the first holding means; (ii) storing data that will be written to the third slave device by the master device in the second holding means, by serving as a slave of the second system bus, so that data transfer on the second system bus by the master device is completed; and (iii) transferring data stored in the first holding means to the second slave device by serving as a master of the second system bus after acquiring the right to use the second system bus; and For a case where a master device on the second system bus has acquired the right to use the second system bus for reading data from the third slave device on the first system bus, this apparatus performs functions: (i) stopping data transfer from the first slave device to the second slave device while retaining data of the first holding means; (ii) reading data from the third slave device and storing it in the second holding means by serving as a master of the first system bus; (iii) transferring data of the second holding means to the master device by serving as a slave of the second system bus, so that data transfer on the second system bus by the master device is completed; and (iv) transferring data held in the first holding means to the second slave device, by serving as a master of the second system bus after acquiring the right to use the second system bus.

It is thus possible to realize mutual access between system buses having an independent arbitration function, without changing system design, and to avoid time-out when, between the system buses, data transfer between slave devices and a transfer between master slave devices are occurred simultaneously on opposite buses.

According to a seventh aspect of the invention, the bus bridge apparatus of the first aspect includes data holding means for temporarily holding transferred data. This bus bridge apparatus reads data from the first slave device on the first system bus and storing it in said first holding means by serving as a master of the first system bus.

When, by data transfer function for writing data stored in the first holding means to the second slave device, transferring data stored in the first slave device to the second slave device by serving as a master of the second system bus, if issued a bus acquisition request to an arbiter on the second system bus for serving as a master of the second system bus after reading data from the first slave device and storing it in said first holding means, For a case where the master device on the second system bus has acquired the right to use the second system bus for writing data in a third slave device on the first system bus, this apparatus performs functions: (i) stopping all operations for serving as a master of the second system bus; (ii) overwriting data that will be written to the third slave device by the master device by serving as a slave of the second system bus, in said first holding means; (iii) writing data held in the said first holding means by serving as a master of the first system bus, so that writing to the third slave device by the master device is completed; (iv) reading again data from the first slave device and storing it in said first holding means, by serving as a master of the first system bus; and (v) rerunning transfer of data from said first holding means to the second slave device by serving as a master of the second system bus.

For a case where a master device on the second system bus has acquired the right to use the second system bus for reading data from the third slave device on the first system bus, this apparatus performs functions: (i) stopping all operations for serving as a master of the second system bus; (ii) reading data from the third slave device and then overwriting it to said first holding means by serving as a master of the first system bus; (iii) transferring data overwritten to said first holding means to the master device by serving as a slave of the second system bus, so that reading from the third slave device by the master device is completed; (iv) reading again data from the first slave device and storing it in said first holding means, by serving as a master of the first system bus; and (v) rerunning transfer of data from said first holding means to the second slave device by serving as a master of the second system bus.

It is thus possible to realize mutual access between system buses having an independent arbitration function, without changing system design, and to avoid time-out even when a system bus on which a slave device to be accessed is present, is busy In addition, a master device can always access a slave device in a given time.

DETAILED DESCRIPTION OF THE PREFERRED EMBODIMENTS

Embodiment 1

Figure 1:
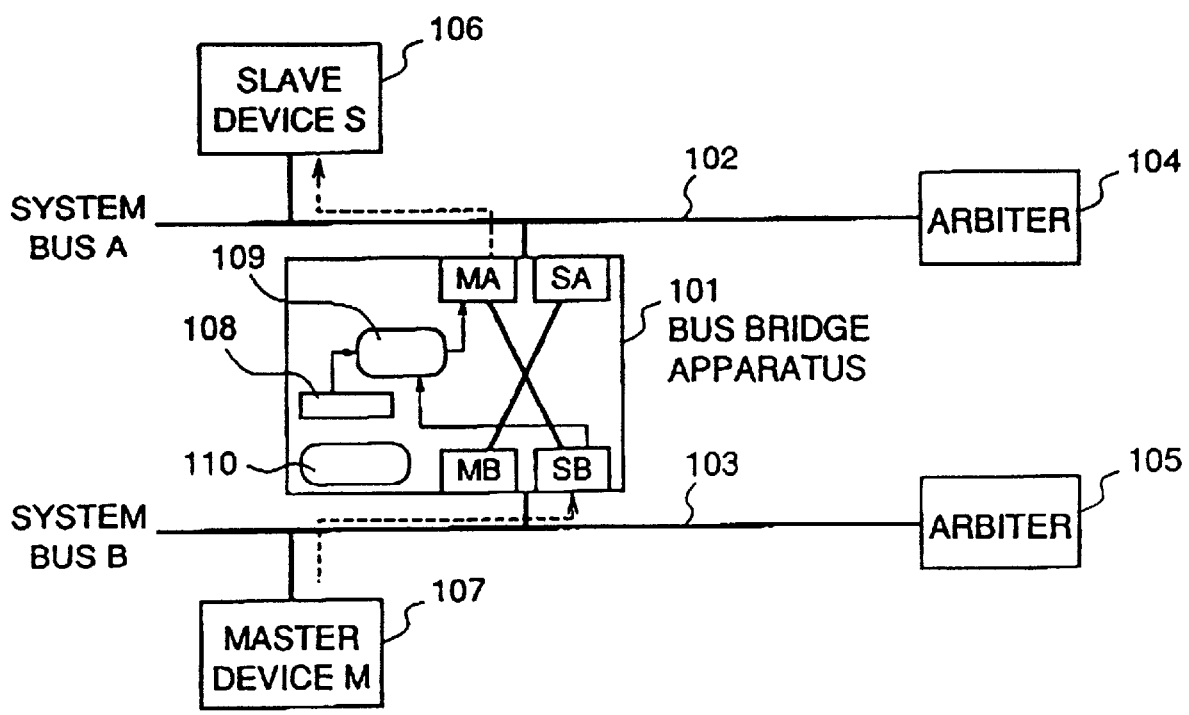
FIG. 1 is a block diagram illustrating a basic construction of a system utilizing a bus bridge apparatus according to a first and second embodiments of the present invention.

FIG. 1 is a block diagram illustrating a basic construction of a system utilizing a bus bridge apparatus according to a first embodiment of the present invention.

A bus bridge apparatus 101 is provided with a base address holding means 108, a bus address generating means 109 and master/slave transfer control means 110.

A system bus A 102 and a system bus B 103 are completely independent of each other. An arbiter 104 and a slave bus S 106 are connected to the system bus A 102. An arbiter 105 and a master device M 107 are connected to the system bus B 103.

Even if the bus bridge apparatus 101 Is removed, both system buses 102 and 103 function independently as a system bus. Thus, the system so constructed realizes that, between two computer systems, one computer system performs access as if a slave device in the other computer system were a slave device on the former, by disposing a bus bridge apparatus of this embodiment between buses of the two computer systems.

Referring to FIG. 1, an operation of access between buses by a bus bridge apparatus of this embodiment will be described.

The bus bridge apparatus 101 has interface functions MA and MB as a bus master, and interface functions SA and SB, as a slave, for the system buses A and B, respectively. Operations of MA, MB, SA, and SB are cooperatively controlled by the master/slave transfer control means 110, in which addresses are previously mapped so that, from the system bus B side, the system bus A is seen as a certain address space.

Assume that the master device M 107 requests bus use right to the arbiter 105 to acquire the right to use the system bus B, and issues the address corresponding to the slave device S 106, thereby starting access to the bus bridge apparatus 101. At this time, the master/slave transfer control means 110 starts the interface function SB on the system bus B, so that the bus bridge apparatus 101 serves as a slave for the master device M 107, while the means 110 starts the interface function MA on the system bus A for serving as a master device, requests bus use right to the arbiter 104 for acquiring the right to use the system bus A and then becomes a bus master.

When the interface function SB receives addresses from the master device M, and the master/slave transfer control means 110 decides that it is an access to a slave device on the system bus A, the means 110 extracts part representing offset from the received addresses Based on base addresses held in the base address holding means 108, and the aforesaid offset, the bus address generating means 109 generates an address for an access destination in the slave device S 106. The base address holding means 108 is reloadable, and the base address is variable.

The interface function MA serving as a bus master issues the address generated by the bus address generating means 109 and then starts an access to the slave device S 106.

By a series of operations as described, a communication path between the master device M 107 and the slave device S 106 through the bus bridge apparatus 101, is established, thus enabling data transfer.

Thus, in Embodiment 1, mutual bus access is realized by retaining the arbitration functions of the independent system buses A and B as they are, without changing system design of the two systems that are independent of each other.

In a bus bridge apparatus of Embodiment 1, by previously mapping addresses so that, from the system bus A, the system bus B is seen as a certain address space, data transfer from a master device on the system bus A to a slave device on the system bus B is possible by the same operation as in the foregoing description.

Embodiment 2

Referring to FIG. 1, a system utilizing a bus bridge apparatus according to a second embodiment will be described. A system constituted by a bus bridge apparatus of Embodiment 1 is likely to cause time-out. Therefore, a system utilizing a bus bridge apparatus of this embodiment is directed to avoid it.

Operation of access between the system buses A, B of a bus bridge apparatus of this embodiment will be described by referring to FIG. 1.

When the master device M 107 attempts to read data from the slave device S 106 through the bus bridge apparatus 101, the bus bridge apparatus 101 requests bus use right to the arbiter 104 in order to be a bus master of the system bus A, however, if the system bus A is presently occupied by another device, the bus bridge apparatus 101 cannot acquire bus use right. For a lengthy wait state, the system bus B is likely to cause time-out. When the bus bridge apparatus 101 decides that the possibility of time-out is high, the apparatus 101 issues an acknowledge signal (RERUN ACKNOWLEDGE) for requesting a rerun or retry of the present access, to the master device M, so that a bus cycle of the system bus B is terminated temporarily.

During this period, the bus bridge apparatus 101 continues to request bus use right to the arbiter 104. If a RERUN ACKNOWLEDGE is issued before acquiring bus use right from the arbiter 104, a bus cycle of the system bus B is completed. Therefore, it is possible to abandon an acquisition request and complete the entire operation. When the bus bridge apparatus 101 has already acquired the right to use the system bus A, a bus cycle of the system bus A is normally completed by performing reading from the slave device S 106, so that the read data is abandoned without inputting to the bus bridge apparatus 101.

Thus, in Embodiment 2, mutual bus access is realized by retaining the arbitration functions of the independent system buses A and B, without changing system design of two independent systems being independent of each other. In addition, even when the system bus A having the slave device S to which access is desired, is busy, and therefore, the master device M on the other system bus B cannot start a read access, it is possible to avoid time-out.

When the master device M attempts to write data to the slave device S through the bus bridge apparatus 101, time-out on the system bus B is avoided by temporarily accepting write data in a write buffer contained in the bus bridge apparatus 101 to complete a bus cycle of the system bus B, and performing writing to the slave device S some time later.

Embodiment 3

Figure 2:
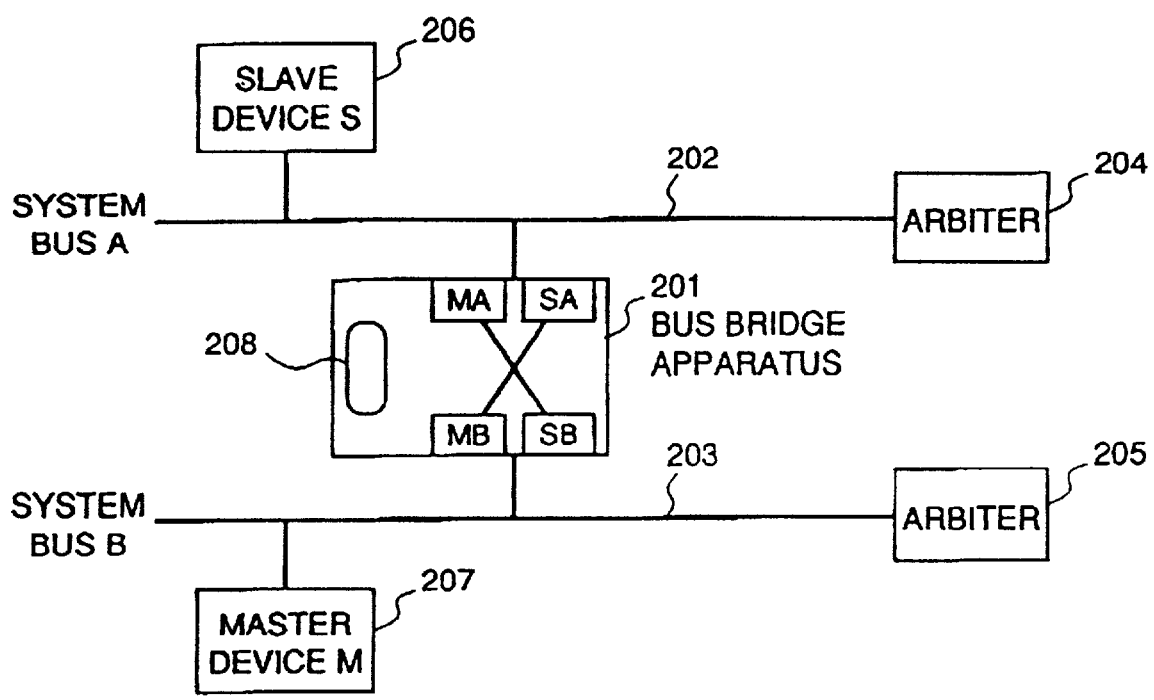
FIG. 2 is a block diagram illustrating a basic construction of a system utilizing a bus bridge apparatus according to a third embodiment.

FIG. 2 is a block diagram illustrating a basic construction of a system utilizing a bus bridge apparatus according to a third embodiment. Time-out is avoided by employing a bus bridge apparatus of this embodiment.

A bus bridge apparatus 201 has a bus cycle generating means 208, and is disposed between a system bus A 202 and a system bus B 203. An arbiter 204 and a slave device S 206 are connected to the system bus A 202. An arbiter 205 and a master device M 207 are connected to the bus B 203. Assume now that the system bus A 202 is a bus in which a bus master having bus use right has the right to access a slave device.

Referring to FIG. 2, an operation of access between the buses by a bus bridge apparatus of this embodiment will be described.

When the master device M 207 attempts to access the slave device S 206 through the bus bridge apparatus 201, if the system bus A is occupied by another device, the bus bridge apparatus 201 cannot acquire the right to use the system bus A, so that it continues to request bus use right to the arbiter 204 on the system bus A. For a lengthy waiting state, the system bus B is likely to cause time-out.

When the bus bridge apparatus 201 decides that the system bus B will cause time-out, the apparatus 201 issues a RERUN ACKNOWLEDGE to the master device M 207, to terminate temporarily a bus cycle of the system bus B. During this period, the apparatus 201 continues to request bus use right to the arbiter 204 on the system bus A.

If a RERUN ACKNOWLEDGE is issued before acquiring the right to use the system bus A from the arbiter 204 on the system bus A, a bus cycle of the system bus B is completed. Therefore, it is possible to abandon a bus acquisition request and complete the entire operation.

On the other hand, if the bus bridge apparatus 201 has already acquired the right to use the system bus A from the arbiter 204 on the systems bus A, since the system bus A is a bus in which a bus master has the right to start access to a slave device, as previously described, the bus cycle generating means 208 delays to send a bus cycle start signal, retaining the bus use right. During this period, if occurred again data transfer from a master device on the system bus B to a slave device on the system bus A, the bus cycle generating means 208 releases a pending status and then issues a bus cycle start signal, so that the bus bridge apparatus 201 accesses a target slave device. In this case, a master device that triggers access is not always the master device M that Issued a RERUN ACKNOWLEDGE in the foregoing description.

Thus, in Embodiment 3, mutual bus access is realized by retaining the arbitration functions of the independent system buses A and B, without changing system design of two independent systems being independent of each other. In addition, even if the system bus A having the slave device S to which access is desired, is busy, and therefore, the master device M on the other system bus B cannot start a read access, it is possible to avoid time-out.

In a bus in which the arbiter 204 takes the bus use right given to a master device and gives it to another master device, if bus use right is taken from the arbiter 204 while the bus bridge apparatus 201 delays to issue a bus cycle start instruction, retaining the bus use right, the bus cycle generating means 208 is reset to an idle state, so that the entire operation is completed.

Embodiment 4

In a system utilizing a bus bridge apparatus of Embodiment 2 or 3, time-out is avoided, however, the master device M does not always access the slave device S within a given time and, in the worst case, infinite RERUN ACKNOWLEDGEs are likely to be issued.

The reason for this is that the master device M does not always win a bus arbitration on the system bus B against other master devices; and that, even if the master device M acquires the right to use the system bus B, when it accesses the bus bridge apparatus, a RERUN ACKNOWLEDGE is likely to be issued depending on the condition of the system bus A.

A system utilizing a bus bridge apparatus according to a fourth embodiment solves such problems, and enables the master device M on the system bus B to access the slave device S of the system bus A.

Figure 3:
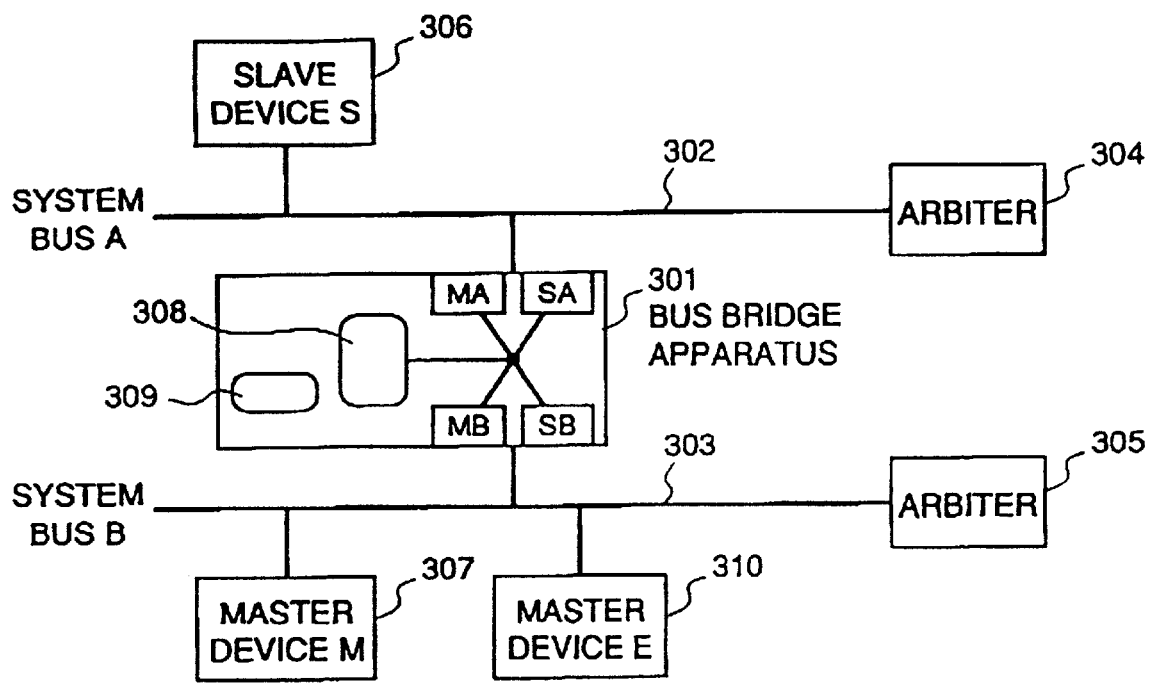
FIG. 3 is a block diagram illustrating a basic construction of a system utilizing a bus bridge apparatus according to a fourth embodiment.

FIG. 3 is a diagram illustrating a basic construction of a system in this embodiment. A bus bridge apparatus 301 has a transfer buffer 308 and a device name storing means 309. An arbiter 304 and a slave device S 306 are connected to a system bus A 302. An arbiter 305, a master device M 307 and a master device E 310 are connected to a system bus B 303.

Referring to FIG. 3, an operation of access between the system buses A and B by a bus bridge apparatus of this embodiment will be described.

In cases where the master device M 307 attempts to read data from the slave device S 306 through the bus bridge apparatus 301, when it takes longer for the bus bridge apparatus 301 to acquire the right to use the system bus A, and it is decided that the system bus B is likely to cause time-out, the bus bridge apparatus 301 issues a RERUN ACKNOWLEDGE to the master device M, to temporarily terminates a bus cycle of the system bus B. At the same time, the name of the master device M 307 is stored in the device name storing means 309. In order to store the name, for example, there are prepared bits as many as master devices so that one bit corresponds to one master device on the system bus B, thereafter, the bits are made valid whenever they are stored.

To decide which master device accesses, there is, for example, employed a signal (grant signal) that indicates the acquisition of the right to use the system bus B, or employed ID number for a bus in which a master device issues ID number along with an address.

Even after the bus bridge apparatus 301 issues a RERUN ACKNOWLEDGE to the master device M 307, it attempts to be a bus master of the system bus A. Assume now that the arbiter 304 on the system bus A is arbitrating a bus by round robin scheduling, and the number of master devices on the system bus A is X If only the bus bridge apparatus 301 continues to issue a bus acquisition request, it wins at the Xth arbitration in the worst case, thus obtaining the right to use the system bus B. As a result, the bus bridge apparatus 301 reads, from the slave device S 306, data to be given to the master device M 307, and then inputs it to the transfer buffer 308, so that a bus cycle of the system bus A is terminated.

On the system bus B, each master bus is issuing a request for acquiring bus use right to the arbiter 305. Assume now that the master device E 310 wins an arbitration to access the bus bridge apparatus 301. In this case, the bus bridge apparatus 301 identifies which master device won the arbitration and then checks with the content of the device name storing means 309. At the moment, since the content of the device name storing means 309 is the master device M, the apparatus 301 decides it is mismatch and then issues a RERUN ACKNOWLEDGE to the master device E.

Assume now that the arbiter 305 is also arbitrating a bus by round robin scheduling, and the number of master devices on the system bus B is Y. Therefore, the master device M will win at the Yth arbitration in the worse case, to obtain the right to use the system bus B. When the master device M wins the arbitration and retries to access the bus bridge apparatus 301, it is decided to be match with the content of the device name storing means 309. Then, it is decided whether the aforesaid reading data from the slave device S to the transfer buffer 308 is completed. If not completed, the bus bridge apparatus 301 issues again a RERUN ACKNOWLEDGE to the master device M. If completed, the apparatus 301 gives data being read in the transfer buffer 308 to the master device M, at the same time, clears the content stored in the device name storing means, thereby completing the entire operation.

The case requiring the longest time to complete the transfer is where the bus bridge apparatus 301 wins the Xth arbitration on the system bus A and then inputs data to the transfer buffer 308, thereafter, the master device M wins the Yth arbitration on the system bus B and reissues a read instruction. The sum of time required in the respective processing is the maximum wait time in this read access.

In cases where the master device M attempts to write data to the slave device S through the bus bridge apparatus 301, it is principally possible to avoid time-out in the system bus B, by that the transfer buffer 308 is employed as a write buffer and write data is temporarily accepted by the transfer buffer 308 for terminating a bus cycle of the system bus B, and that data is later written to the slave device S.

Thus, in Embodiment 4, mutual bus access is realized by retaining the arbitration functions of the independent system buses A and B, without changing system design of two independent systems being independent of each other. Further, even when the system bus A having the slave device S to which access is desired, is busy, and therefore, the master device M on the other system bus B cannot start a read access, it is possible to avoid time-out. Furthermore, the master device M surely performs a read access to the slave device S within a given time.

Figure 4:
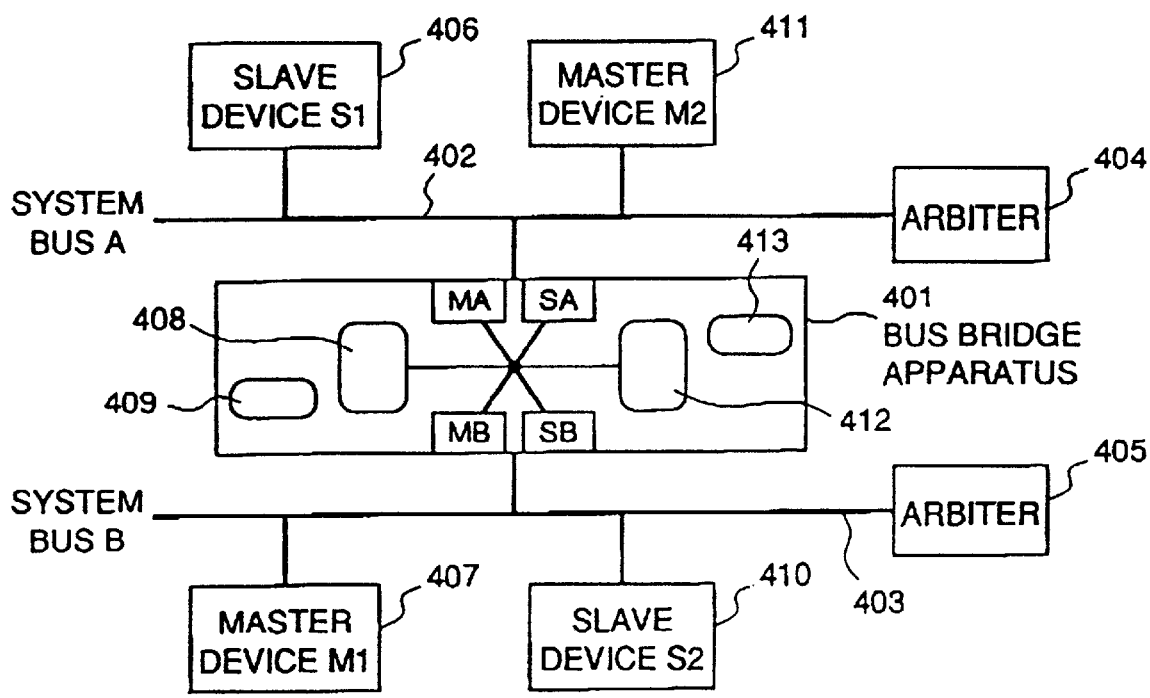
FIG. 4 is a block diagram illustrating a basic construction of a system utilizing a bus bridge apparatus according to a fourth embodiment.

FIG. 4 is a block diagram illustrating a system to which a bus bridge apparatus of Embodiment 4 is utilized. A bus bridge apparatus 401 has a first transfer buffer 408, a first device name storing means 409, a second transfer buffer 412 and a second device name storing means 413. An arbiter 404, a slave device S1 406 and a master device M2 411 are connected to a system bus A 402. An arbiter 405, a master device M1 407 and a slave device S2 410 are connected to a system bus B 403.

In this way, by adding one more pair of a transfer buffer and a device name storing means, even if data reading from the slave device S1 406 on the system bus A 402 to the master device M1 407 on the system bus B 403, and data reading from slave device S2 410 on the system bus B to the master device M2 411 on the system bus A 402, are performed at the same time, it is possible to complete both data transfers in the same processing as in the foregoing description, without causing a deadlock state and time-out on both system buses.

Embodiment 5

As in Embodiment 4, a system utilizing a bus bridge apparatus according to a fifth embodiment surely accesses the slave device S within a given time. This embodiment is particularly related to a case where the system bus A is a bus in which a bus master succeeded in acquiring bus use right has the right to access a slave device.

Figure 5:
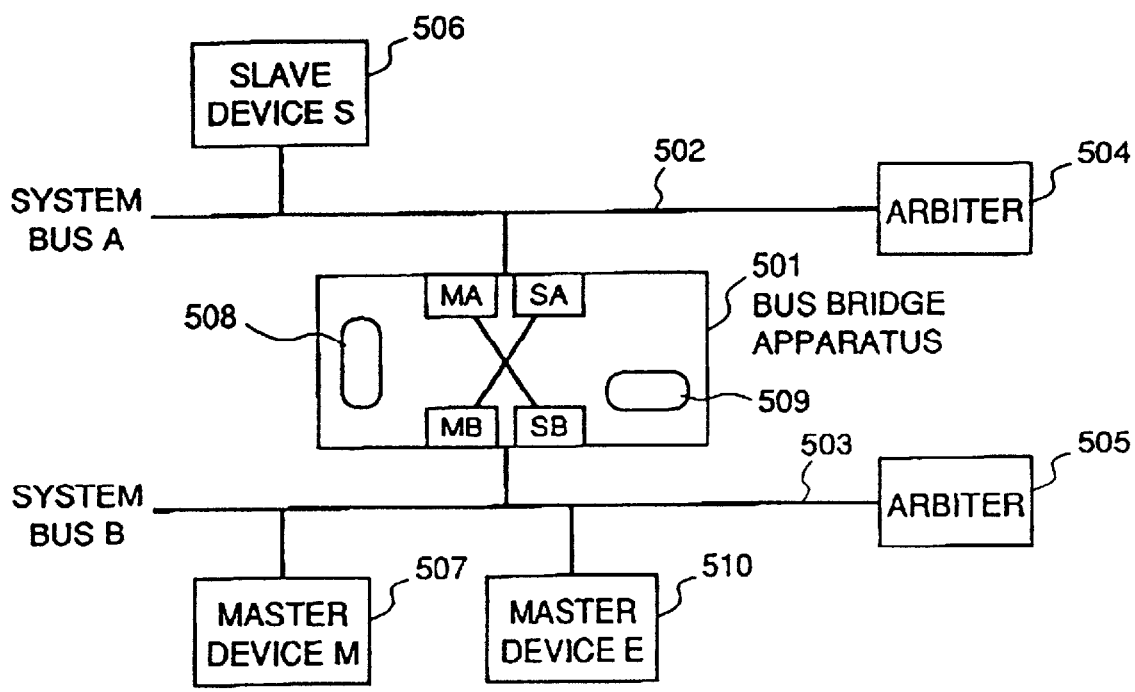
FIG. 5 is a block diagram illustrating a basic construction of a system utilizing a bus bridge apparatus according to a fifth embodiment.

FIG. 5 is a block diagram illustrating a basic construction of a system utilizing a bus bridge apparatus of this embodiment. A bus bridge apparatus 501 has a bus cycle generating means 508 and a device name storing means 509. An arbiter 504 and a slave device S 506 are connected to a system bus A 502 An arbiter 505, a master device M 507 and a master device B 510 are connected to a system bus B 503.

As shown in FIG. 5, the bus bridge apparatus 501 is provided with the bus cycle generating means 508 that delays to issue a bus cycle start signal while retaining bus use right, as described in Embodiment 3, and the device name storing means 509 as described in Embodiment 4.

Referring to FIG. 5, an operation of access between the system buses A and B by the bus bridge apparatus 501 will be described.

In cases where the master device M 507 attempts to access the slave device S 506 through the bus bridge apparatus 501, if it takes longer to acquire the right to use the system bus A, and it is decided that the system bus B is likely to cause time-out, the bus bridge apparatus 501 issues a RERUN ACKNOWLEDGE to the master device M 507, thus terminating a bus cycle temporarily. At the same time, the name of the master device M 507 is stored in the device name storing means 509. During this time, the bus bridge apparatus 501 continues to request bus use right to the arbiter 504 on the system bus A.

If a RERUN ACKNOWLEDGE is issued before obtaining the right to use the system bus A from the arbiter 504, a bus cycle of the system bus B is completed. It is thus possible to abandon the request to complete the entire operation. On the other hand, if already obtained the right to use the system bus A, since the system bus A is a bus in which a bus master has the right to start access to a slave device, as previously described, the bus cycle generating means 508 delays to issue a bus cycle start signal while retaining the bus use right.

On the system bus B, each master device is issuing a request for acquiring bus use right to the arbiter 505 on the system bus B. Assume now that the master device E 510 wins an arbitration and then accesses the bus bridge apparatus 501. In this case, the bus bridge apparatus 501 identifies which master device won the arbitration and then checks with the content of the device name storing means 509. At the moment, since the content of the device name storing means 509 is the master device M, it is decided to be mismatch when the master device M accesses the bus bridge apparatus 501, and then issued a RERUN ACKNOWLEDGE to the master device E.

When the master device M wins an arbitration and retries to access the bus bridge apparatus 501, it is decided that it matches with the content of the device name storing means 509. At this time, it is decided whether the bus cycle generating means 508 has obtained the right to use the system bus A. If not yet, the bus bridge apparatus 501 issues a RERUN ACKNOWLEDGE to the master device M. If already obtained, the bus cycle generating means 508 releases a temporary pending state to issue a bus cycle start signal, and accesses the master device M through the bus bridge apparatus 501 and, at the same time, clears the content stored in the device name storing means 509, thereby completing the entire operation.

In the cases where the arbiter 504 takes the bus use right given to the master device and then gives it to another master device, if bus use right is taken from the, arbiter 504 while the bus bridge apparatus 501 delays to issue a bus cycle start instruction, retaining the right to use the system bus A, the bus bridge apparatus 501 issues again a bus acquisition request to the arbiter 504. Upon the receipt of bus use right, the apparatus delays again to issue a bus cycle start signal. In this case, if the arbiter 504 frequently attempts to take the bus use right given to the master device, even if the master device M wins the arbitration to access again the bus bridge apparatus 501 with much effort, a RERUN ACKNOWLEDGEs will be often issued because the apparatus 501 does not have the right to use the system bus A. To this point attention must be paid in designing system of the system bus A.

Thus, in Embodiment 5, mutual bus access is realized by retaining the arbitration functions of the independent system buses A and B, without changing system design of two independent systems being independent of each other Further, even if the system bus A having the slave device S to which access is desired, is busy, and therefore, the master device M on the other system bus B cannot start a read access, it is possible to avoid time-out. Furthermore, the master device M surely performs a read access to the slave device S within a given time.

Embodiment 6

A bus bridge apparatus according to a sixth embodiment avoids a deadlock state without containing a bus arbiter function therein, when a master/slave transfer and an inter-slave transfer are performed at the same time, between system buses A and B that are completely independent of each other.

Figure 6:
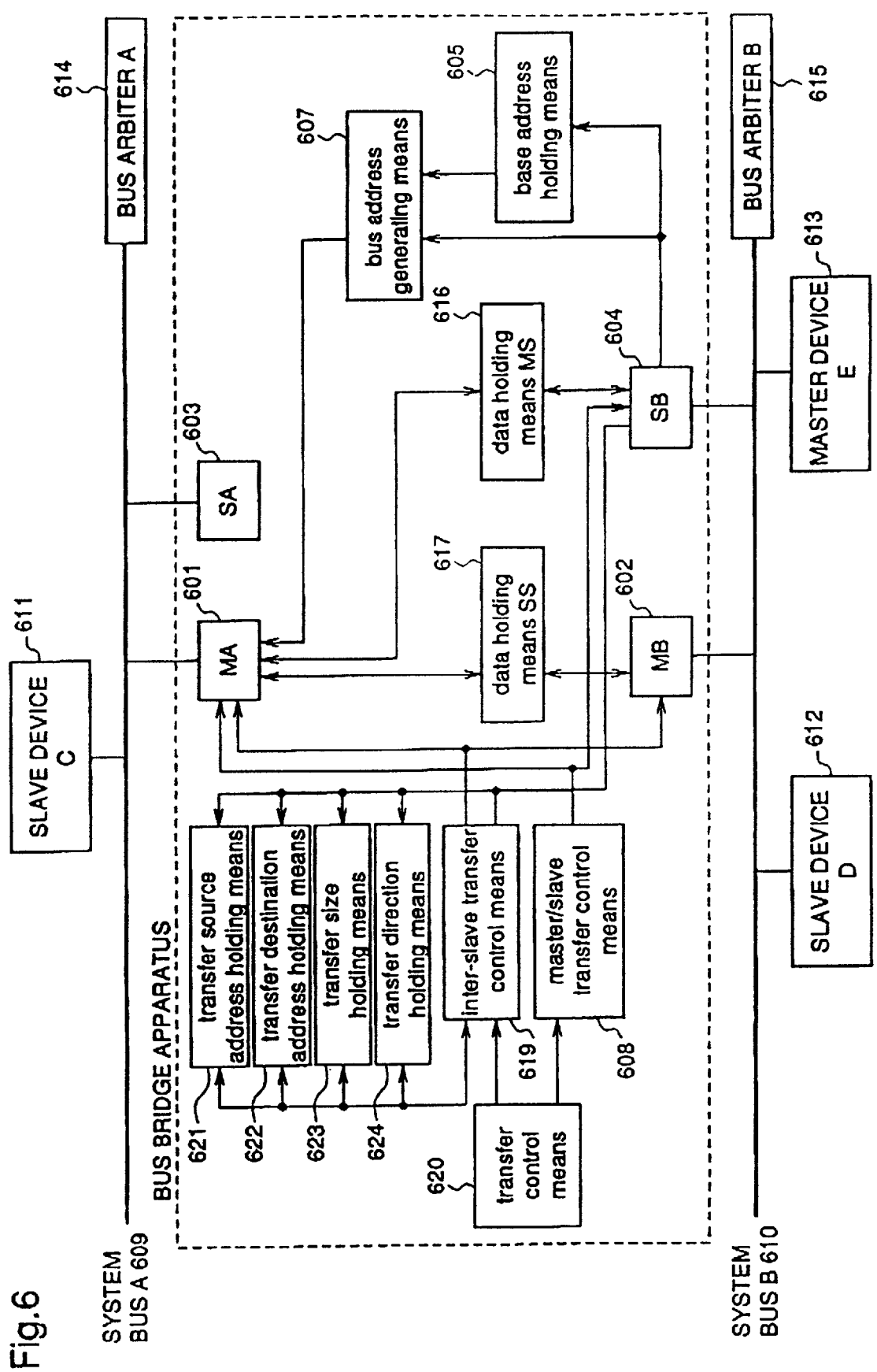
FIG. 6 is a block diagram illustrating a basic construction of a system utilizing a bus bridge apparatus according to a sixth embodiment.

FIG. 6 is a diagram for explaining a construction of a bus bridge apparatus of this embodiment and devices connected thereto. An interface function MA 601 as a bus master, an interface function MB 602 as a bus master, an interface function SA 603 as a slave, an interface function SB 604 as a slave, a base address holding means 605, a bus address generating means 607, master/slave transfer control means 608, a system bus A 609, a system bus B 610, a slave device C 611, a slave device D 612, a master device E 613, a bus arbiter A 614 and a bus arbiter B 615, have the same function as in the foregoing Embodiments.

Data holding means MS 616 temporarily holds transferred data when transferring data between a slave device on the system bus A 609 and a master device on the system bus B 610 (i.e., master/slave transfer). Data holding means SS 617 temporarily holds transferred data when transferring data between a slave device on the system bus A 609 and a slave device on the system bus B 610 (i.e., inter-slave transfer). Inter-slave transfer control means 619 controls data transfer in the inter-slave transfer. Transfer control means 620 arbitrates between the master/slave transfer and the inter-slave transfer. Transfer source address holding means 621 holds the address of a transfer source slave in the inter-slave transfer, and its initial value is set by the master device E 613 through the interface function SB 604, and then incremented by the inter-slave transfer control means 619 during data transfer. Transfer destination address holding means 622 holds the address of a transfer destination slave in the inter-slave transfer, and its initial value is set by the master device E 613 through the interface function SB 604, and then incremented by the inter-slave transfer control means 619 during data transfer. Transfer size holding means 623 holds the size of data transfer in the inter-slave transfer, and its initial value is set by the master device E 613 through the interface function SB 604, and then decremented by the inter-slave transfer control means 619 during data transfer. Transfer direction holding means 624 holds the direction of data transfer in the inter-slave transfer, a direction is set before data transfer, by the master device E 613 through the interface function SB 604. For "0", data transfer from the system bus A 609 to the system bus B 610 is executed. For "1", data transfer from the system bus B 610 to the system bus A 609 is executed.

Operations of a bus bridge apparatus so constructed will be described by illustrating two examples.

(i) Operation I refers to a case where, during the inter-slave transfer of 64 bytes data led by an address C1 of the slave device C to a region led by an address D1 of the slave device D, the master device E reads 4 bytes data read by an address C2 of the slave device C, by utilizing the master/slave transfer of a bus bridge apparatus.

Figure 7:
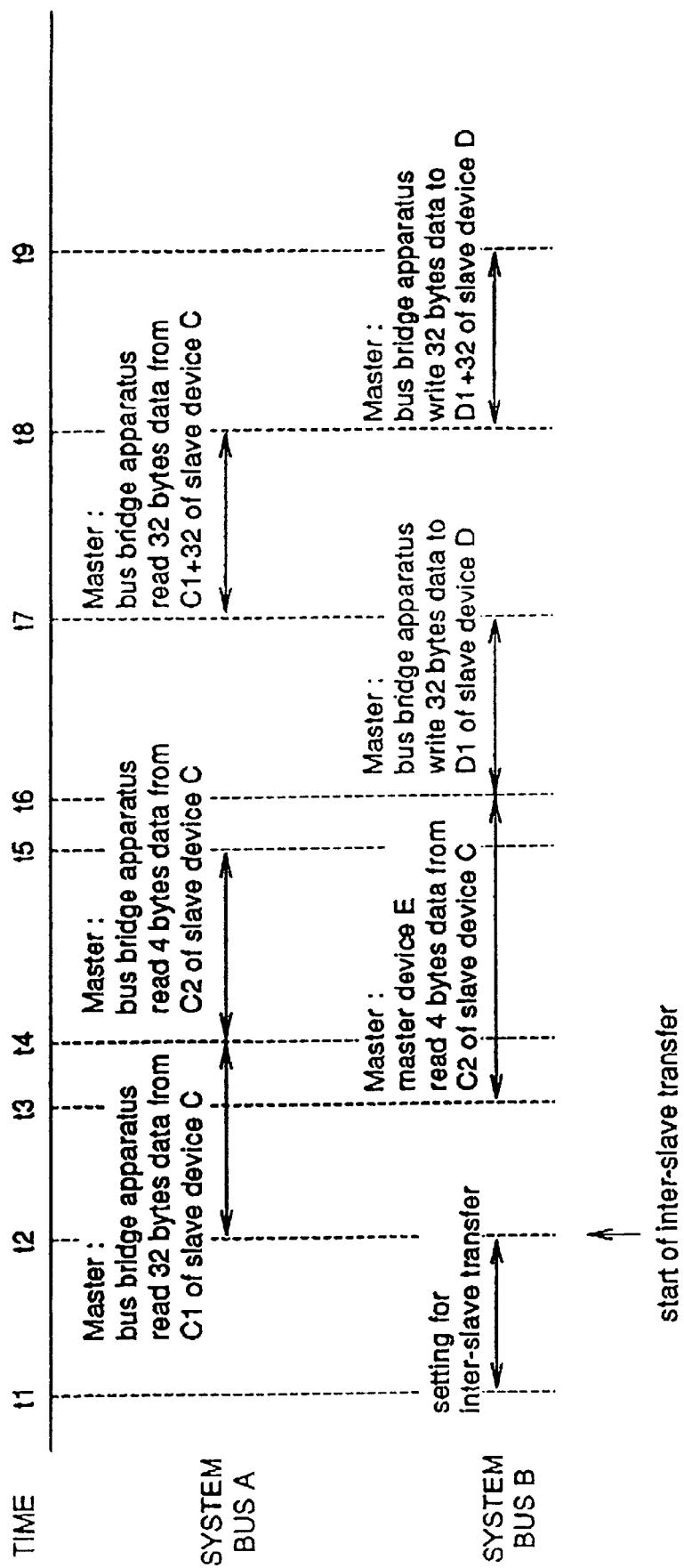
FIG. 7 is a timing chart for explaining a first operation of the system utilizing the bus bridge apparatus of the sixth embodiment.

FIG. 7 is a diagram showing operations of the system buses A, B in Operation I.

Between time t1 and t2, to perform the inter-slave transfer from the slave device C to the slave device D, the master device E 613 writes C1 that is a transfer source address, to the transfer source address holding means 621, writes "64" that is a transfer size, to the transfer size holding means 623, and writes "0" as a transfer direction (transfer from the system bus A to B), to the transfer direction holding means 624, through the interface function SB 604, respectively.

At time t2, a transfer start instruction is given to the inter-slave transfer control means 619 through the interface function SB 604, whereby the bus bridge apparatus starts the inter-slave transfer from the slave device C to the slave device D. The inter-slave transfer control means 619 instructs the interface function MA 601 to serve as a bus master of the system bus A, in order to read 32 bytes data from the address C1 of the slave device C and then store it in the data holding means SS 617. The reason why the transfer size at the moment is 32 bytes, is that the maximum size per bus cycle on the system bus A is 32 bytes. The interface function MA 601 issues a bus acquisition request to the bus arbiter 614, in order to be a master of the system bus A. At this time, since the system bus A is not being used, the bus arbiter 614 gives bus use right to the bus bridge apparatus. As a result, the interface function MA 601 becomes a bus master of the system bus A and reads 32 bytes data from the address C1 of the slave device C, thereby storing it in the data holding means SS 617.

Assume now that, on the system bus B, at time t3, the master device E starts a bus cycle for reading 4 bytes data led by the address C2 of the slave device C, by the master/slave transfer in the bus bridge apparatus. Accordingly, the master/slave transfer control means 608 issues an operation start instruction to the interface function MA 601. At this time, however, the MA 601 is being used for the inter-slave transfer, resulting in a wait state. At time t4, the 32 bytes data has been read from the address C1 of the slave device C on the system bus A The inter-slave transfer control means 619 instructs the interface function MB 602 to serve as a bus master of the system bus B, so that the 32 bytes data stored in the date holding means SS 617 is transferred to an address D1 of the slave device D. Then, the MB 602 issues a bus acquisition request to the bus arbiter B 615, in order to be a bus master of the system bus B. At this time, however, the system bus B is being used by the master device E. It is thus unable to acquire bus use right. Therefore, the MB 602 is in a wait state until it acquires bus use right.

From time t4, the MA 601 starts a bus cycle in which 4 bytes data is read from the address C2 of the slave device C and then stored in the data holding means MS 616.

At time t5, the bus cycle is completed, and the master/slave transfer control means 608 instructs the interface function SB 604 to transfer data stored in the data holding means MS 616 to the master device E. The SB 604 executes this and then completes the bus cycle of the master device E started at time t3. The bus arbiter B 615 gives bus use right to the bus bridge apparatus. Then, the MB 602 serves as a bus master of the system bus B to transfer the 32 bytes data stored in the data holding means SS 617 to the address D1 of the slave device D.

At time t7, that transfer is completed, whereby the value of the transfer source address holding means 621 is incremented by 32 and results in C1+32, that of the transfer destination address holding means 622 is incremented by 32 and results in D1+32, and that of the transfer size holding means 623 is incremented by 32 and results in 32.

Between time t7 and t8, 32 bytes data is read from an address C1+32 of the slave device C and then stored in the data holding means SS 617.

Between time t8 and t9, the 32 bytes data stored in the means 617 is transferred to an address D1+32 of the slave device D.

If that transfer is completed at time t9, the value of the transfer source address holding means 621 is incremented by 32 and results in C1+64, that of the transfer destination address holding means 622 is incremented by 32 and results in D1+64, and that of the transfer size holding means 623 is decremented by 32 and results in 0, thus completing the inter-slave transfer.

(ii) Operation II refers to a case where, during the inter-slave transfer of 64 bytes data led by an address C1 of the slave device C to a region led by an address D1 of the slave device D, the master device E writes 4 bytes data possessed by itself to a region led by an address C2 of the slave device C, by utilizing the master/slave transfer in a bus bridge apparatus.

Figure 8:
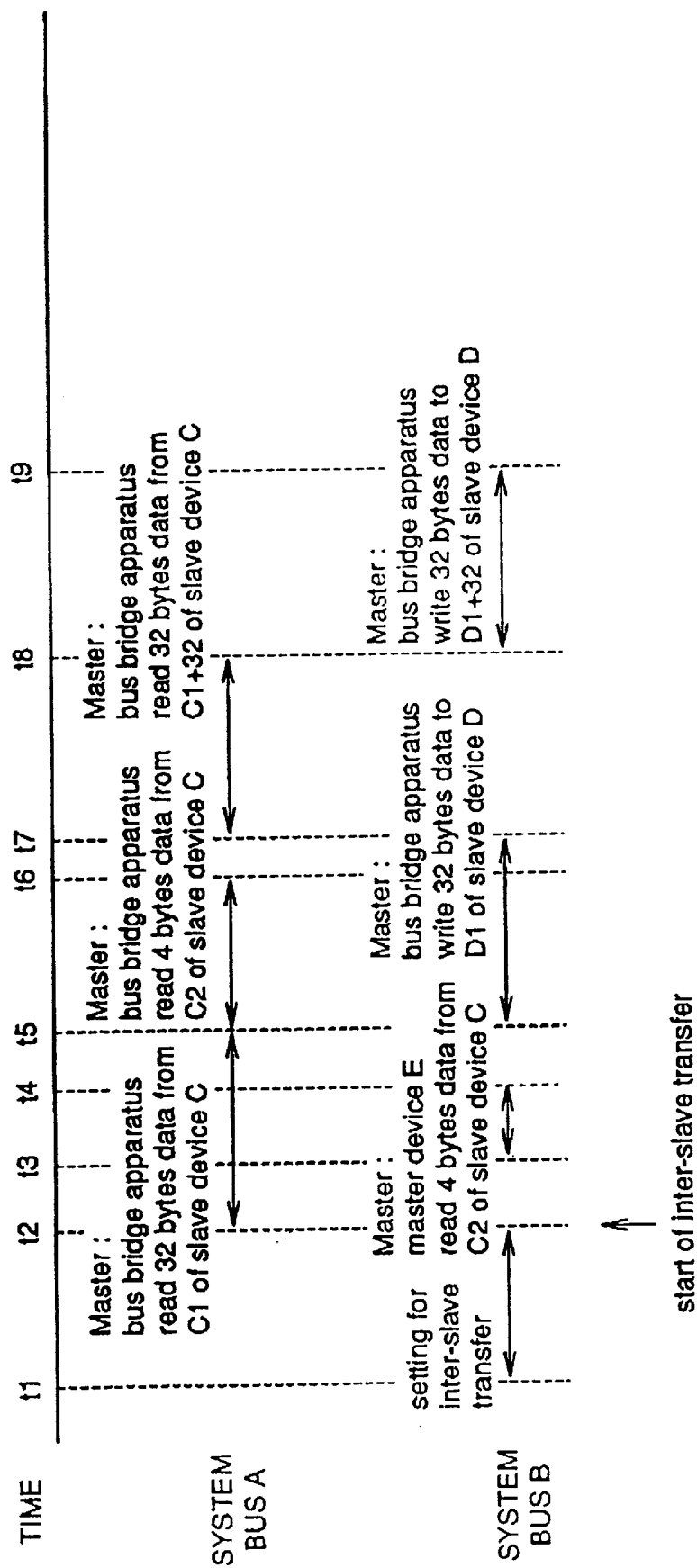
FIG. 8 is a timing chart for explaining a second operation of the system utilizing the bus bridge apparatus of the sixth embodiment.

FIG. 8 is a diagram showing operations of the system buses A, B in Operation II.

Between time t1 and t2, to perform the inter-slave transfer from the slave device C to the slave device D, the master device E 613 writes C1 that is a transfer source address, to the transfer source address holding means 621, writes "64" that is a transfer size, to the transfer size holding means 623, and writes "0" as a transfer direction (transfer from the system bus A to B), to the transfer direction holding means 624, through the interface function SB 604, respectively.

At time t2, a transfer start instruction is given to the inter-slave transfer control means 619 through the interface function SB 604, whereby the bus bridge apparatus starts the inter-slave transfer from the slave device C to the slave device D. The inter-slave transfer control means 619 instructs the interface function MA 601 to serve as a bus master of the system bus A, in order to read 32 bytes data from the address C1 of the slave device C and then store it in the data holding means SS 617. The reason why the transfer size at the moment is 32 bytes, is that the maximum size per bus cycle on the system bus A is 32 bytes. The interface function MA 601 issues a bus acquisition request to the bus arbiter A 614, in order to be a master of the system bus A. At this time, since the system bus A is not being used, the bus arbiter A 614 gives bus use right to the bus bridge apparatus. As a result, the interface function MA 601 becomes a bus master of the system bus A and reads 32 bytes data from the address C1 of the slave device C, thereby storing it in the data holding means SS 617.

On the system bus B, assume now that, at time t3, the master device E starts a bus cycle for writing 4 bytes data possessed by itself to a region led by the address C2 of the slave device C, by utilizing the master/slave transfer in the bus bridge apparatus. The master/slave transfer control means 608 issues an operation start instruction to the interface function SB 601. The SB 601 receives 4 bytes write data from the master device E, and holds it in the data holding means SS 617, thus completing the operation at time t4. Accordingly, the bus cycle of the master device E on the system bus B is completed. At the same time, the master/slave transfer control means 608 issues an operation start instruction to the interface function MA 601. At this time, the MA 601 is being used for the inter-slave transfer, resulting in a wait state.

At time t5, 32 bytes data has been read from the address C1 of the slave deice C on the system bus A. The inter-slave transfer control means 619 instructs the MA 602 to serve as a bus master of the system bus B and transfer the 32 bytes data stored in the data holding means SS 617 to the address D1 of the slave device D. Then, the MB 602 issues a bus acquisition request to the bus arbiter B 615, in order to be a bus master of the system bus B. At this time, since the system bus B is not being used, the bus arbiter B 615 gives bus use right to the bus bridge apparatus. As a result, the MB 602 serves as a bus master of the system us B, and then transfers the 32 bytes data stored in the data holding means SS 617 to the address D1 of the slave device D. At time t7, this transfer is completed.

On the other hand, if the operation of the interface function MA 601 is completed at time t5, the master/slave transfer control means 608 that has been in a wait state, is in an operation state and then issues again an operation start instruction to the MA 601 Then, the MA 601 issues a bus acquisition request to the bus arbiter A 614, in order to be a bus master of the system bus A. At this time, since the system bus A is not being used, the bus arbiter A 614 gives bus use right to the bus bridge apparatus. As a result, the MA 601 becomes a bus master of the system bus A and then transfers 4 bytes data held in the data holding means SS 617 to the address C2 of the slave C, whereby the transfer is completed at time t6.

Meanwhile, if transfer of 32 bytes data stored in the data holding means SS 617 to the address D1 of the slave device D is completed at time t7, the value of the transfer source address holding means 621 is incremented by 32 and results in C1+32, that of the transfer destination address holding means 622 is incremented by 32 and results in D1+32, and that of the transfer size holding means 623 is decremented by 32 and results in 32.

Between time t7 and t8, 32 bytes data is read from an address C1+32 of the slave device C and then stored in the data holding means SS 617.

Between time t8 and t9, the 32 bytes data stored in the means SS 617 is transferred to an address D1+32 of the slave device D.

If the aforesaid transfer is completed at time t9, the value of the transfer source address holding means 621 is incremented by 32 and results in C1+64, that of the transfer destination address holding means 622 is incremented by 32 and results in D1+64, and that of the transfer size holding means 623 is decremented by 32 and results in 0, thus completing the inter-slave transfer.

Thus, in Embodiment 6, when the master/slave transfer and the inter-slave transfer are performed at the same time, a deadlock state is avoided by including data holding means MS and SS that operate independently for a specific use, without containing a bus arbiter function in a bus bridge apparatus.

Embodiment 7

A bus bridge apparatus according to a seventh embodiment avoids a deadlock state when a master/slave transfer and an inter-slave transfer are performed at the same time, between system buses A and B that are completely independent of each other, by providing only one data holding means, without containing a bus arbiter function in a bus bridge apparatus.

Figure 9:
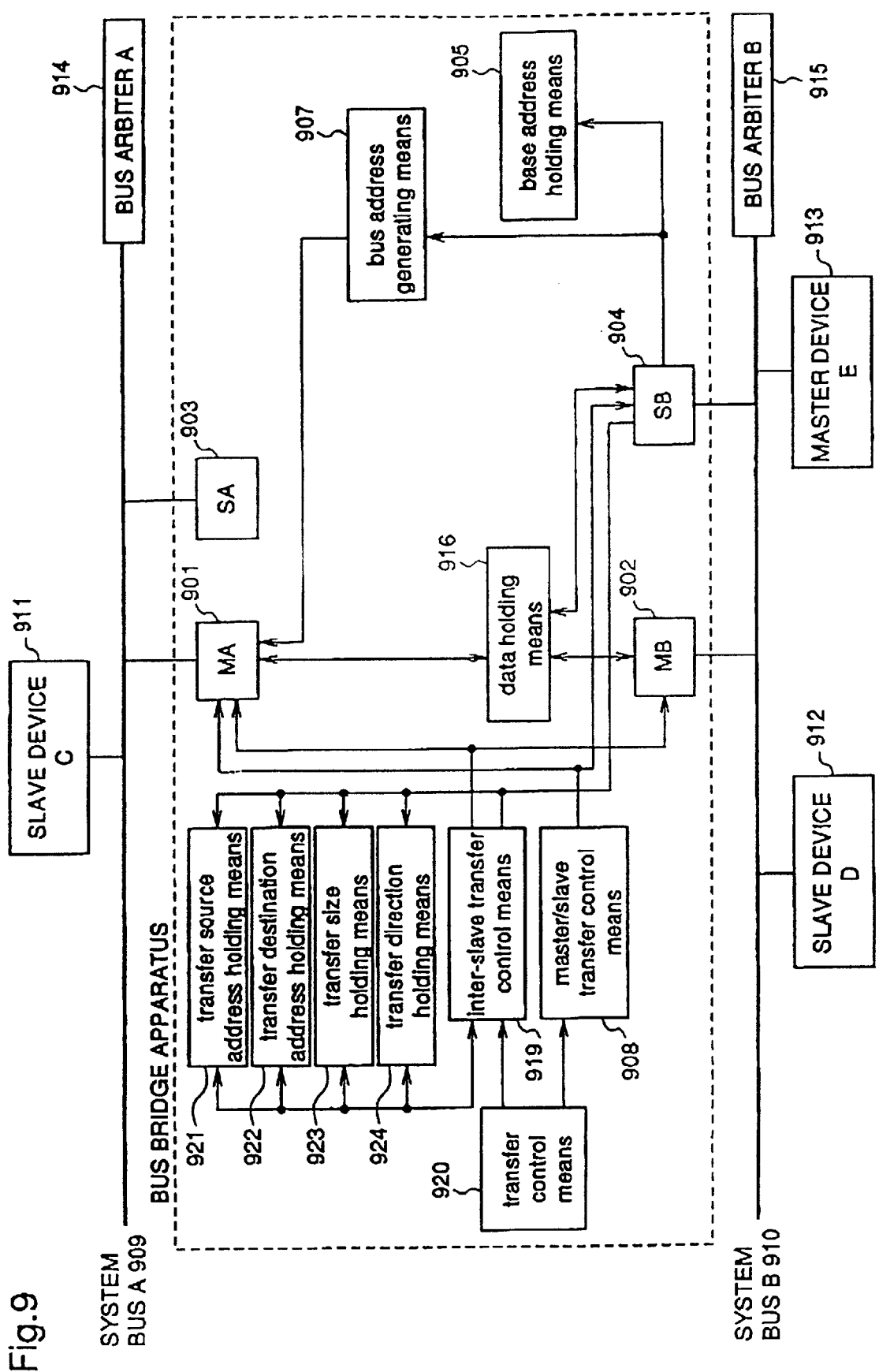
FIG. 9 is a block diagram illustrating a basic construction of a system utilizing a bus bridge apparatus according to a seventh embodiment.

FIG. 9 is a diagram for explaining a construction of a bus bridge apparatus of this embodiment and devices to be connected thereto. An interface function MA 901 as a bus master, an interface function MB 902 as a bus master, an interface function SA 903 as a slave, an interface function SB 904 as a slave, a base address holding means 905, a bus address generating means 907, master/slave transfer control means 908, a system bus A 909, a system bus B 910, a slave device C 911, a slave device D 912, a master device E 913, a bus arbiter A 914, a bus arbiter B 915, inter-slave transfer control means 919, a transfer control means 920, a transfer source address holding means 921, a transfer destination address holding means 922, a transfer size holding means 923 and a transfer direction holding means 924, are the same as in Embodiment 6.

Data holding means 916 temporarily holds transferred data in performing data transfer between a slave device on the system bus A 909 and a master device on the system bus B 910 (i.e., master/slave transfer) and, in performing data transfer between a slave device on the system bus A 909 and a slave device on the system bus B 910 (i.e., inter-slave transfer).

Operations of a bus bridge apparatus so constructed will be described by illustrating two examples.

(i) Operation I refers to a case where, during the inter-slave transfer of 64 bytes data led by an address C1 of the slave device C to a region led by an address D1 of the slave device D, the master device E reads 4 bytes data led by an address C2 of the slave device C, by utilizing the master/slave transfer in a bus bridge apparatus.

Figure 10:
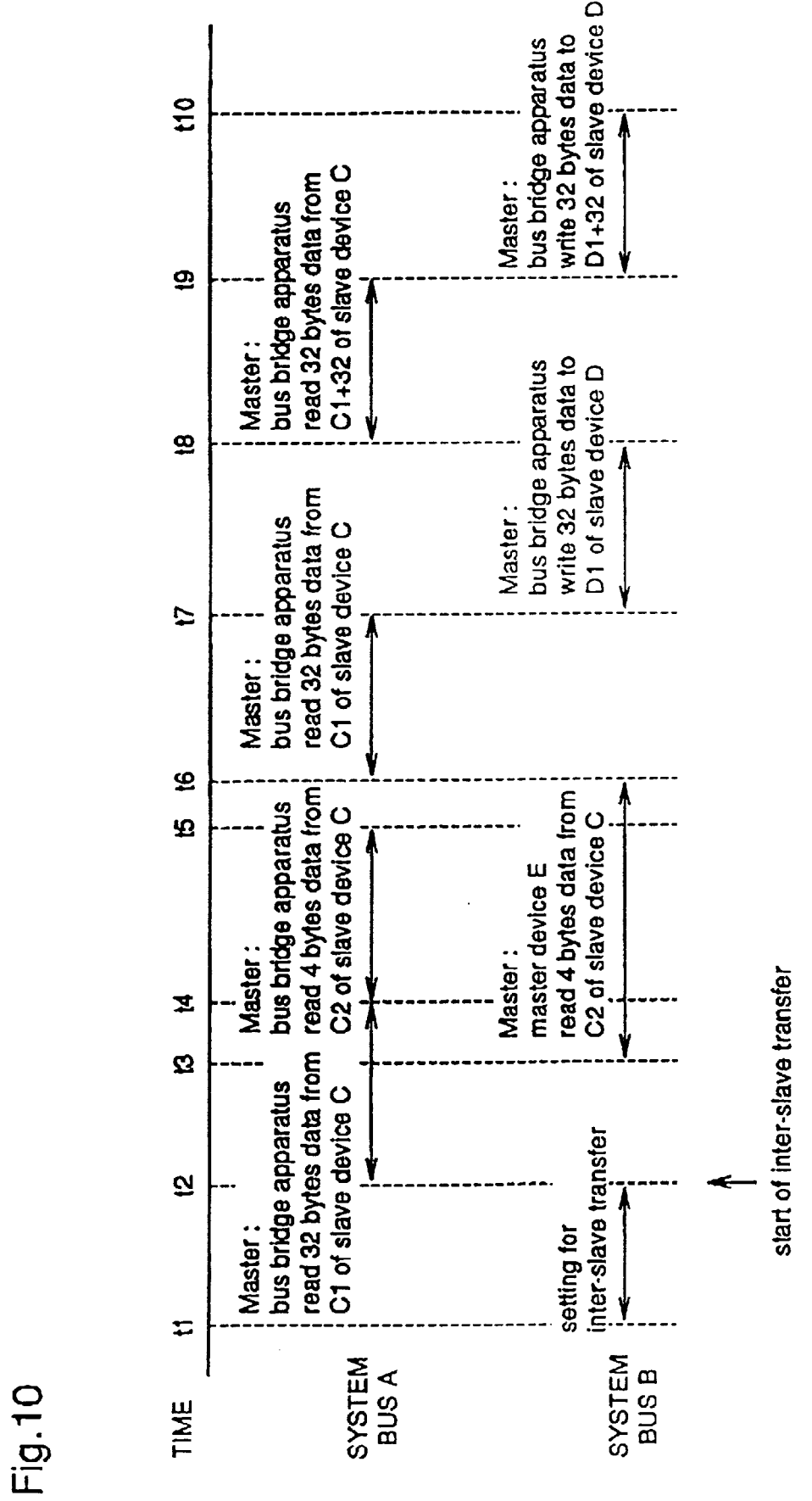
FIG. 10 is a timing chart for explaining a first operation of the system utilizing the bus bridge apparatus of the seventh embodiment.

FIG. 10 is a diagram showing operations of the system buses A, B in Operation I.

Between time t1 and t2, to perform the inter-slave transfer from the slave device C to the slave device D, the master device E 913 writes C1 that is a transfer source address, to the transfer source address holding means 921, writes "64" that Is a transfer size, to the transfer size holding means 923, and writes "0" as a transfer direction (transfer from the system bus A to B), to the transfer direction holding means 924, through the interface function SB 904, respectively.

At time t2, a transfer start instruction is given to the inter-slave transfer control means 919 through the interface function SB 904, whereby the bus bridge apparatus starts the inter-slave transfer from the slave device C to the slave device D. The inter-slave transfer control means 919 instructs the interface function MA 901 to serve as a bus master of the system bus A, in order to read 32 bytes data from the address C1 of the slave device C and then store it in the data holding means SS 916. The reason why a transfer size at the moment is 32 bytes, is that the maximum size per bus cycle in the system bus A is 32 bytes. The interface function MA 901 issues a bus acquisition request to the bus arbiter 914, in order to be a master of the system bus A. At this time, since the system bus A is not being used, the bus arbiter 914 gives bus use right to the bus bridge apparatus. As a result, the interface function MA 901 becomes a bus master of the system bus A and reads 32 bytes data from the address C1 of the slave device C, thereby storing it in the data holding means SS 916.

On the system bus B, assume now that, at time t3, the master device E starts a bus cycle for reading 4 bytes data led by the address C2 of the slave device C, by the master/slave transfer in the bus bridge apparatus. The master/slave transfer control means 908 attempts to operate. At this time, however, the data holding means 916 is being used for the inter-slave transfer, resulting in a wait state.

At time t4, the 32 bytes data has been read from the address C1 of the slave device C on the system bus A, the inter-slave transfer control means 919 instructs the interface function MB 902 to serve as a bus master of the system bus B, so that the 32 bytes data stored in the data holding means SS 917 is transferred to an address D1 of the slave device D. Then, the MB 902 issues a bus acquisition request to the bus arbiter B 915, in order to be a bus master of the system bus B. At this time, however, the system bus B is being used by the master device E. It is thus unable to acquire bus use right. Therefore, the MB 902 is in a wait state until it acquires bus use right.

As described above, when the master/slave transfer control means 908 and the inter-slave transfer control means 919 are both in a wait state, the transfer control means 920 abandons data stored in the data holding means 916 and then gives the right to use the means 916 to the master/slave transfer control means 908. At the same time, the transfer control means 920 informs the inter-slave transfer control means 919 that the data transfer is canceled. Thus, the master/slave transfer control means 908 resumes the operation and gives an operation instruction to the interface function MA 901.

From time t4, the MA 901 starts a bus cycle in which 4 bytes data is read from the address C2 of the slave device C and then stored in the data holding means MS 916.

At time t5, the bus cycle is completed, and the master/slave transfer control means 908 instructs the interface function SB 904 to transfer data stored in the data holding means MS 916 to the master device E. The interface function SB 904 executes this. At time t6, the bus cycle of the master device E started at time t3 is completed. The transfer control means 920 instructs the inter-slave transfer control means 919 to rerun data transfer operation. The means 919 instructs again the interface function MA 901 to serve as a bus master of the system bus A and to read 32 bytes data from the address C1 of the slave device C, and then to store it into the data holding means 916. Thus, between time t6 and t7, the MA 901 serves as a bus master of the system bus A, so that the 32 bytes data is read from the address C1 of the slave device C, and then stored in the data holding means 916.

Next, the inter-slave transfer control means 919 instructs the interface function MB 902 to serve as a bus master of the system bus B to read 32 bytes data stored in the data holding means 916 and then transfer it to an address D1 of the slave device D. Thus, the MB 902 serves as a bus master of the system bus B to transfer the 32 bytes data stored in the data holding means 916 to the address D1 of the slave device D.

At time t8, that transfer is completed, whereby the value of the transfer source address holding means 921 is incremented by 32 and results in C1+32, that of the transfer destination address holding means 922 is incremented by 32 and results in D1+32, and that of the transfer size holding means 923 is decremented by 32 and results in 32.

Between time t8 and t9, 32 bytes data is read from an address C1+32 of the slave device C and then stored in the data holding means SS 916.

Between time t9 and t10, the 32 bytes data stored in the means 916 is transferred to an address D1+32 of the slave device D.

Meanwhile, if the aforesaid transfer is completed at time t9, the value of the transfer source address holding means 921 is incremented by 32 and results in C1+64, that of the transfer destination address holding means 922 is incremented by 32 and results in D1+64, and that of the transfer size holding means 923 is decremented by 32 and results in 0, thus completing the inter-slave transfer.

(ii) Operation II refers to a case where, during the inter-slave transfer of 64 bytes data led by an address C1 of the slave device C to a region led by an address D1 of the slave device D, the master device E writes 4 bytes data possessed by itself to a region led by an address C2 of the slave device C, by utilizing the master/slave transfer in a bus bridge apparatus.

Figure 11:
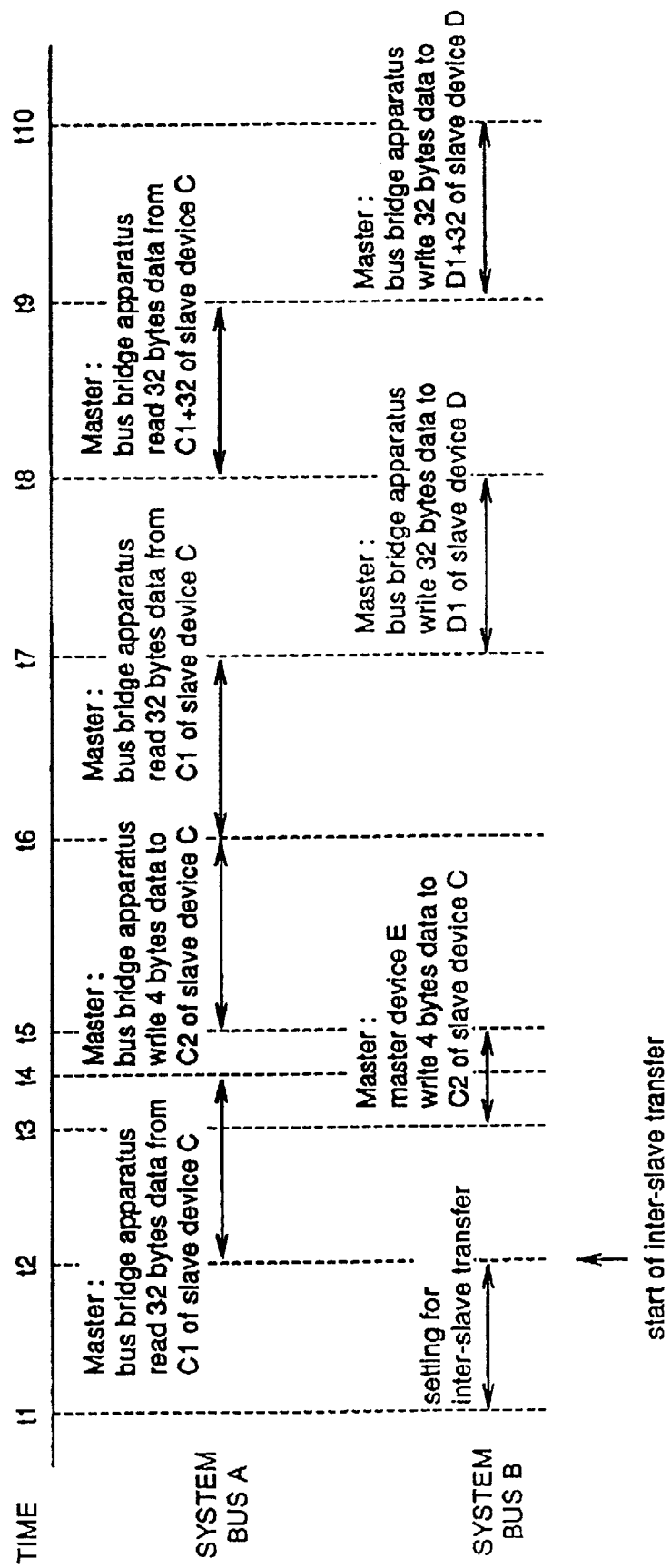
FIG. 11 is a timing chart for explaining a second operation of the system utilizing the bus bridge apparatus of the seventh embodiment.
Figure 12:
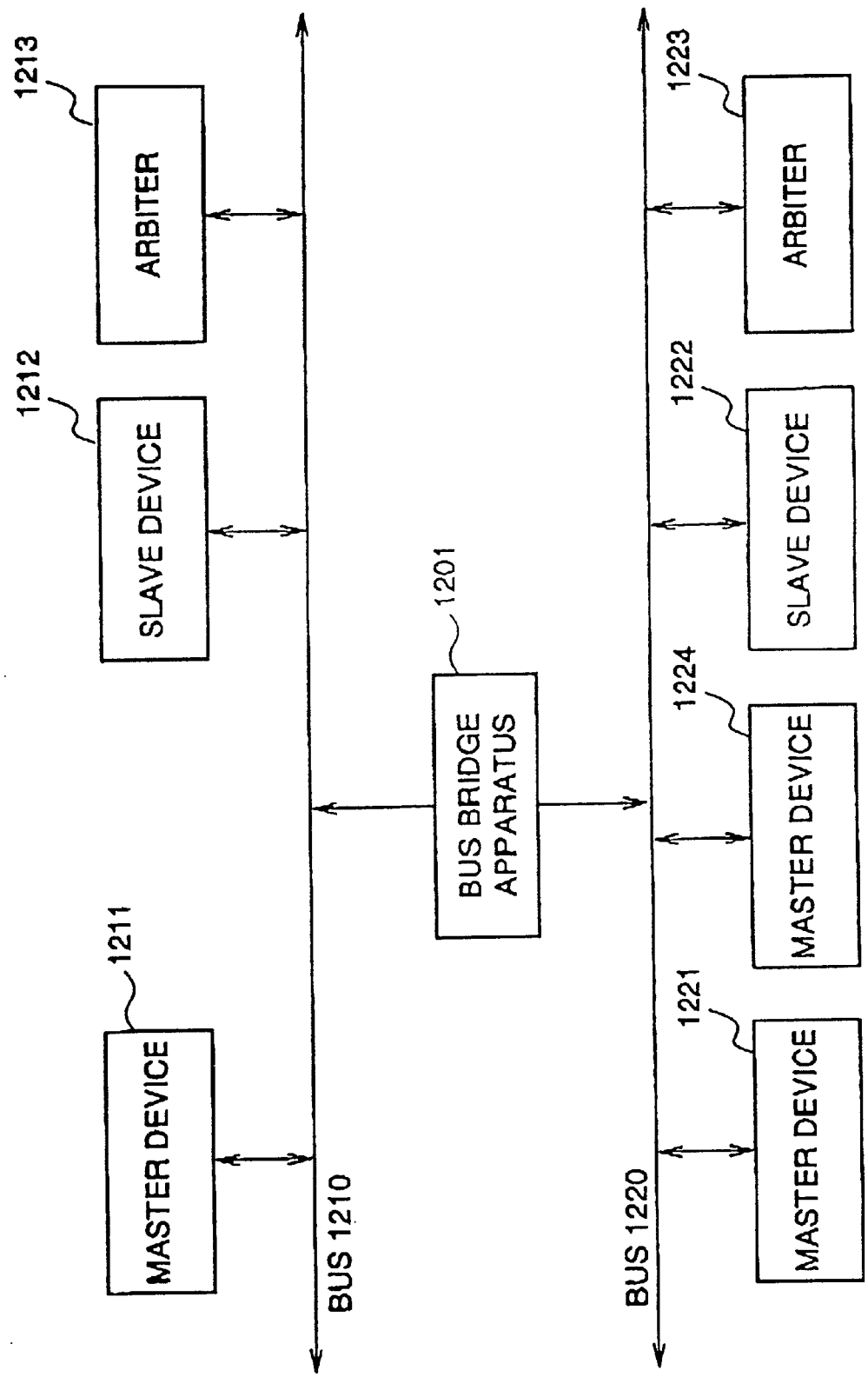
FIG. 12 is a diagram illustrating a system in which a conventional bus bridge apparatus is disposed between two independent system buses.

FIG. 11 is a diagram showing operations of the system buses A, B in Operation II.

Between time t1 and t2, to perform the inter-slave transfer from the slave device C to the slave device D, the master device E 913 writes C1 that is a transfer source address, to the transfer source address holding means 921, writes "64" that is a transfer size, to the transfer size holding means 923, and writes "0" as a transfer direction (transfer from the system bus A to B), to the transfer direction holding means 924, through the interface function SB 904, respectively.

At time t2, a transfer start instruction is given to the inter-slave transfer control means 919 through the interface function SB 904, whereby the bus bridge apparatus starts the inter-slave transfer from the slave device C to the slave device D. The inter-slave transfer control means 919 instructs the interface function MA 901 to serve as a bus master of the system bus A, in order to read 32 bytes data from the address C1 of the slave device C and then store it in the data holding means SS 916. The reason why a transfer size at the moment is 32 bytes, is that the maximum size per bus cycle in the system bus A is 32 bytes. The interface function MA 901 issues a bus acquisition request to the bus arbiter 914, in order to be a master of the system bus A. At this time, since the system bus A is not being used, the bus arbiter 914 gives bus use right to the bus bridge apparatus. As a result, the interface function MA 901 becomes a bus master of the system bus A and reads 32 bytes data from the address C1 of the slave device C, thereby storing it in the data holding means SS 916.

On the system bus B, assume now that, at time t3, the master device E starts a bus cycle for writing 4 bytes data possessed by itself to a region led by the address C2 of the slave device C, by utilizing the master/slave transfer in the bus bridge apparatus. Although the master/slave transfer control means 908 attempts to start operation, at the moment, the data holding means 916 is being used for the inter-slave transfer, resulting in a wait state.

At time t4, 32 bytes data has been read from the address C1 of the slave deice C on the system bus A. The inter-slave transfer control means 919 instructs the MA 902 to serve as a bus master of the system bus B and then transfer the 32 bytes data stored in the data holding means SS 916 to the address D1 of the slave device D. Then, the MB 902 issues a bus acquisition request to the bus arbiter B 915, in order to be a bus master of the system bus B.

At this time, however, the system bus B is being used by the master device E. It is thus unable to acquire bus use right. Therefore, the MB 902 is in a wait sate until it acquires bus use right. In this way, when the master/slave transfer control means 908 and the inter-slave transfer control means 919 are both in a wait state, the transfer control means 920 abandons data stored in the data holding means 916 and gives the right to use the data holding means 916 to the master/slave transfer control means 908. At the same time, the transfer control means 920 informs the inter-slave transfer control means 919 that the data transfer is canceled. Thus, the master/slave transfer control means 908 resumes the operation and then gives an operation instruction to the interface function MA 901. The MA 901 receives 4 bytes data from the master device E and holds it in the data holding means 916, thus completing the operation at time t5.

Accordingly, the bus cycle of the master device E on the system bus B is completed. At the same time, the master/slave transfer control means 908 issues an operation start instruction to the interface function MA 901. Then, the MA 901 serves as a bus master of the system bus A and transfers the 4 bytes data held in the data holding means 916 to the address C2 of the slave C. This transfer is completed at time t6.

The transfer control means 920 instructs the inter-slave transfer control means 919 to rerun data transfer operation. Thus, the means 919 instructs again the interface function MA 901 to serve as a bus master of the system bus A, to read 32 bytes data from the address C1 of the slave device C, and then store it to the data holding means 916.

Between time t6 and t7, the MA 901 serves as a bus master of the system bus A, so that the 32 bytes data is read from the address C1 of the slave device C, and then stored in the data holding means 916.

Next, the inter-slave transfer control means 919 instructs the interface function MB 902 to serve as a bus master of the system bus B and transfer the 32 bytes data stored in the data holding means 916 to the address D1 of the slave device D. Then, the MB 902 serves as a bus master of the system bus B to transfer 32 bytes data stored in the data holding means 916 to the address D1 of the slave device D.

At time t8, the aforesaid transfer is completed, whereby the value of the transfer source address holding means 921 is incremented by 32 and results in C1+32, that of the transfer destination address holding means 922 is incremented by 32 and results in D1+32, and that of the transfer size holding means 923 is decremented by 32 and results in 32.

Between time t8 and t9, 32 bytes data is read from an address C1+32 of the slave device C and stored in the data holding means 916.

Between time t9 and t10, the 32 bytes data stored in the means 916 is transferred to an address D1+32 of the slave device D.

Meanwhile, if the aforesaid transfer is completed at time t9, the value of the transfer source address holding means 921 is incremented by 32 and results in C1+64, that of the transfer destination address holding means 922 is incremented by 32 and results in D1+64, and that of the transfer size holding means 923 is decremented by 32 and results in 0, thus completing the inter-slave transfer.

Thus, in Embodiment 7, in a case where a deadlock state is likely to occur when a master/slave transfer and an Inter-slave transfer are performed at the same time by data transfer control means, with only one data holding means, it is possible to avoid a deadlock state by abandoning data that has been transferred to the data holding means by the inter-slave transfer, and preferentially executing the master/slave transfer, without containing a bus arbiter function in a bus bridge apparatus.

What is claimed is:

1. A bus bridge apparatus for connecting a first system bus and a second system bus, each being an independent system bus and having a bus arbiter, comprising:

storing means for storing a plurality of base addresses for slave devices on the first and second system buses;

master/slave interface means for receiving an access request from a master on the second system bus to access a slave on the first system bus and for transferring data from the slave device to the master device;

generating means connected with said base address storing means and said master/slave interface means for generating an access destination address in accordance with the access request and with base addresses; and transfer control means for controlling said master/slave interface means in response to access destination address to transfer data from the slave device on the first system bus to the master device on the second system bus, whereby the bus bridge apparatus serves as a slave device on the second system bus and as a master device on the first system bus.

* * * * *